United States Patent [19]

Pavlov et al.

[11] Patent Number: 5,588,977
[45] Date of Patent: Dec. 31, 1996

[54] METHOD OF PRODUCING GLASS MATERIALS FROM ASH-SLAG WASTE

[75] Inventors: Vyacheslav F. Pavlov; Vasily F. Shabanov; Alexandr G. Anshits; Sergei G. Bayakin, all of Krasnoyarsk, Russian Federation

[73] Assignee: East West Trade Group, Inc., Alexandria, Va.

[21] Appl. No.: 467,638

[22] Filed: Jun. 6, 1995

Related U.S. Application Data

[63] Continuation-in-part of Ser. No. 144,476, Nov. 2, 1993, abandoned.

[51] Int. Cl.$^6$ .................................................. C03B 19/08
[52] U.S. Cl. .................... 65/17.4; 65/22; 65/20; 65/135.9; 501/39; 501/84
[58] Field of Search ................... 65/20, 22, 17.4, 65/135.9; 501/39, 84

[56] References Cited

U.S. PATENT DOCUMENTS

| | | |
|---|---|---|
| 2,236,691 | 4/1941 | Meinzer . |
| 2,390,901 | 4/1951 | Stout ........................................ 501/39 |
| 2,590,902 | 4/1951 | Stout ........................................ 501/39 |
| 2,977,721 | 4/1961 | von Gronow et al. . |
| 3,151,966 | 10/1964 | Slayter ..................................... 501/39 |
| 3,231,231 | 1/1966 | McMillan . |
| 3,441,396 | 4/1969 | D'Eustachio et al. . |
| 4,165,233 | 8/1979 | Gagneraud . |
| 4,191,546 | 3/1980 | Kroyer . |
| 4,198,224 | 4/1980 | Kirkpatrick . |
| 4,318,727 | 3/1982 | Pietsch . |
| 4,826,788 | 5/1989 | Dennert et al. . |
| 4,933,306 | 6/1990 | Pietsch . |
| 5,326,382 | 7/1994 | Oat ............................................ 501/39 |

FOREIGN PATENT DOCUMENTS

| | | | |
|---|---|---|---|
| 2034011 | 1/1972 | Germany ........................... 501/39 |
| 165528 | 11/1964 | U.S.S.R. . |
| 288243 | 11/1971 | U.S.S.R. . |
| 1654278A1 | 6/1991 | U.S.S.R. . |
| 227848 | 12/1925 | United Kingdom ................ 65/20 |

OTHER PUBLICATIONS

N. M. Pavlushkin, "The Basis of Devitrified Glass Technology", 1979, Stroiizdat, (Moscow) pp. 239–240.

V. F. Pavlov et al., "Reprocessing Technology For Coal Ash Pellets", Academy of Sciences of the USSR Order of Lenin Siberian Division L. V. Kirensky Physics Institute SKTB NAUKA (Science)., Krasnoyarsk 1991.

*Primary Examiner*—John Hoffmann
*Attorney, Agent, or Firm*—Lowe, Price, LeBlanc & Becker

[57] ABSTRACT

A method of obtaining glass materials from ash-slag. Waste wherein the waste is heated to a melting point temperature and melted in a reducing medium. The obtained melt is cooled by a thermal shock to form a foamed glass material. Prior to heating the charge, the carbon content therein is brought to 3.0–8.0 wt %, and the foamed glass material is foamed under a flow of a gaseous medium resulting form decomposition of carbides formed in the melt as a result of carbon content adjustment. Carbon addition also reduces iron oxide present in the waste, this reduction facilitating iron separation from the foamed material.

11 Claims, 1 Drawing Sheet

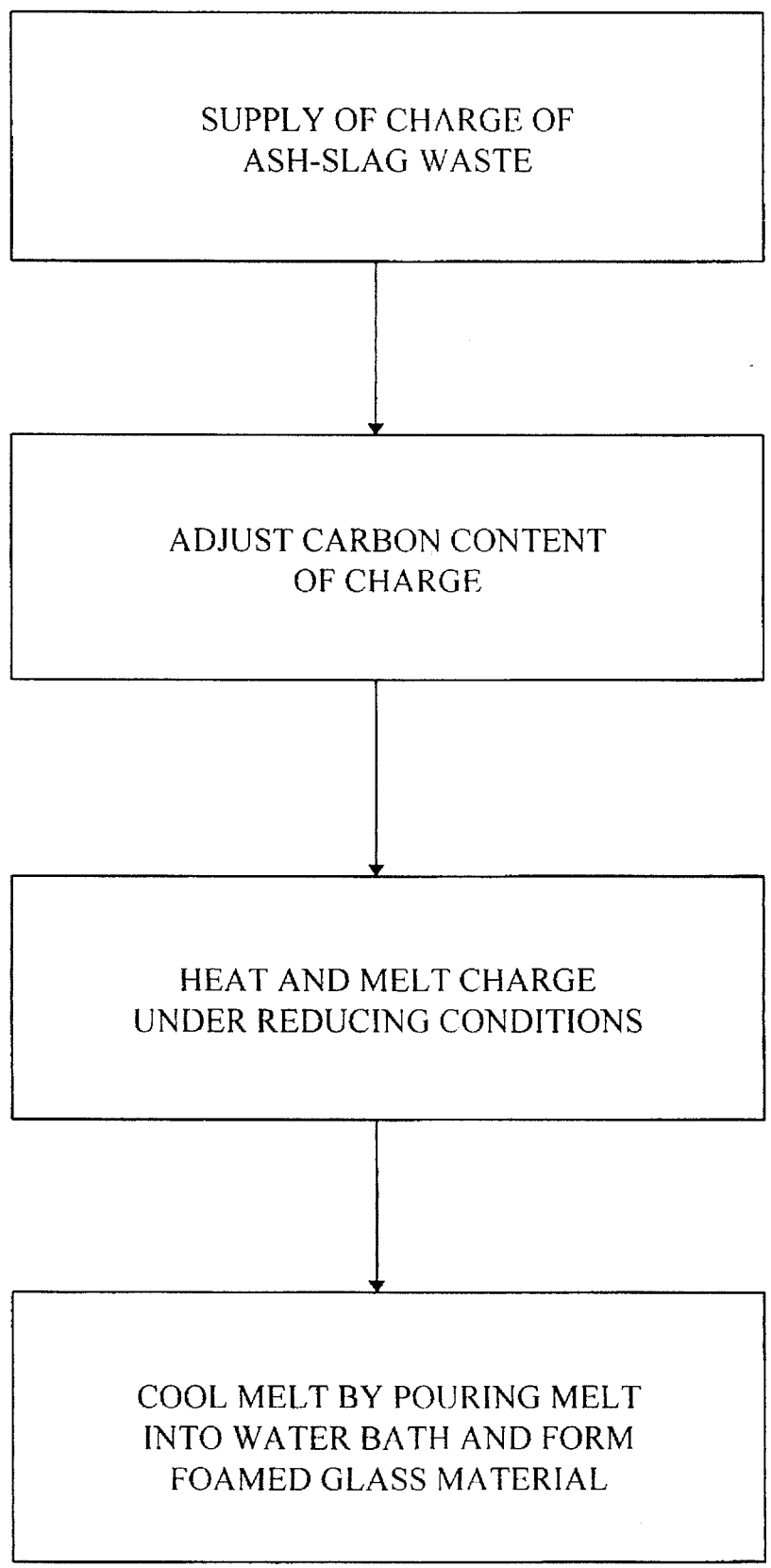

METHOD OF PRODUCING GLASS MATERIALS FROM ASH-SLAG WASTE

This is a continuation-in-part of Ser. No. 08/144,476 filed Nov. 2, 1993 abandoned.

FIELD OF THE INVENTION

The present invention relates to construction materials, and, particularly, to a method of producing glass materials from ash-slag waste which can also find wide application in chemical industry, in radio electronics and other branches of industry.

BACKGROUND OF THE INVENTION

Known in the art is a method of producing glass materials consisting in that a charge including the following ingredients (wt %): 47.6 $SiO_2$, 29.6 $Al_2O_3$, 15.8 $Fe_2O_3$, 4.2 CaO, 0.6 MgO, 1.7 $K_2O$, 0.5 $Na_2O$ is heated to a melting point temperature and melted in a graphite crucible, whereupon the melt obtained is slowly cooled (E. J. Deguire, S. H. Risbud. Journal of Materials Science, v. 19, N6 (1984) 1760–1766 "Crystallization and properties of glasses prepared from Illinois coal fly ash.")

The known method given a non-transparent material with a large content of iron (15 wt %) which substantially reduces the field of its application, particularly, makes it applicable only in construction industry and quite inapplicable in optical devices.

Known in the art is a method of preparation of glass materials from ash-slag waste having the following composition wt %:

| | |
|---|---|
| CaO total | 5.0–41.0 |
| CaO unbound | 4.0–13.0 |
| $SiO_2$ | 13.0–75.0 |
| $Al_2O_3$ | 5.0–26.0 |
| carbon | 1.0–2.0 |
| $Fe_2O_3$ | 1–24 |
| MgO | 2.0–6.0 |
| $Na_2O$ | 0.1–1.0 |
| $K_2O$ | 0.2–1.0 |
| $SO_3$ | 0.1–0.6 |
| $TiO_2$ | 0.2 |

This ash-slag waste is the by-product of energy production using hard coal and brown coal.

In this method, a charge of this ash-slag waste is heated to a melting point in a reducing medium, whereupon the obtained melt is cooled by a thermal shock till a glass material is formed (Reprint of the Institute of physics of Siberian Division of the Academy of Sciences of the USSR, N 74, 1991 Krasnoyarsk, Pavlov V. F. et al. "A technique of Processing ashes, coals KATEK") herein incorporated by reference.

This type of ash-slag waste is difficult to reprocess due to its high calcium oxide content and presence of transient metals such as iron, manganese, chromium, titanium and others. The transient metals also limit the use of this waste material as a raw material for achieving transparent glass ceramic materials.

In the prior art, glass materials from all known ash-slag waste materials featuring comparatively low conductivity are used as heat-insulating materials. However, prior art methods fail to attain complete purification of the ash-slag waste being processed from impurities of transition metals, which to a great extent reduces the range of application of the glass materials since they can not be utilized in the manufacture of optically transparent glass materials.

As such, a need has developed to provide improved methods to obtain glass materials which are used for both for heat insulating applications and optical material applications. Responsive to this need, the present invention provides an improved method which overcomes the deficiencies in the prior art methods by the elimination of transient metal impurities and bonding of calcium oxide to form a glass material useful for insulating, wear resistance and optical material application.

DISCLOSURE OF THE INVENTION

It is an object of the present invention to provide a method of producing glass materials from ash-slag waste, which will considerably improve the quality of the glass materials obtained due to complete purification of the charge from admixtures of transition metals and binding of free calcium oxide.

One object of the present invention is to provide a method of processing the waste material generated from the burning of coals containing high levels of calcium oxide and transient metal such as iron, manganese, chromium, titanium or the like, e.g. up to 25% CaO and up to 24% $Fe_2O_3$.

A further object of the invention includes a method of producing glass materials from ash-slag waste, having the following composition, wt %:

| | |
|---|---|
| CaO total | 5.0–41.0 |
| CaO unbound | 4.0–13.0 |
| $SiO_2$ | 13.0–75.0 |
| $Al_2O_3$ | 5.0–26.0 |
| carbon | 1.0–2.0 |
| $Fe_2O_3$ | 1.0–24.0 |
| MgO | 2.0–6.0 |
| $Na_2O$ | 0.1–1.0 |
| $K_2O$ | 0.2–1.0 |
| $SO_3$ | 0.1–0.6 |
| $TiO_2$ | 0.2 |

The ash-slag waste is heated to a melting point temperature and melted in a reducing medium, whereupon the melt obtained is cooled by a thermal shock, i.e. immersion in a cooling bath, preferably water, until a foamed glass material is formed. According to the invention, prior to heating the charge, the carbon content of the charge is brought to 3.0–8.0 wt %, and the formation of the foamed glass material is carried out in a flow of a gaseous medium. In one embodiment, where it is required to obtain a glass material with a maximum porosity adapted for use as a heat-insulating material, the gaseous medium is derived from gases resulting from decomposition of carbides in water which occurs during the thermal shock.

Alternatively, if it is necessary to obtain a glass material of a spherical shape which finds wide application in diverse branches of industry, for instance from chemical industry (as filters) to aircraft industry (as a light heat-insulating material), the gaseous medium is supplemented by the addition of an inert gas fed to the melt.

It is possible that the gaseous medium is essentially a mixture of the additionally fed inert gas and the gases resulting form decomposition of carbides in water. This will enable one to obtain glass materials from ash-slag waste with maximum porosity and low content of aluminum oxides and calcium oxides.

For the manufacture of lime bricks, wall facing tiles used in construction industry, advantageously, the obtained glass material is additionally disintegrated and press-molded with subsequent heating or roasting.

The obtained material may also be additionally heated to form a melt and then slowly cooled. This helps obtain glass ceramic wear-resistant materials.

To produce optical materials with a wide transmissivity and a high transparency in the visible and infrared spectra of electromagnetic waves, the foamed glass material obtained should be additionally heated to form a melt and then cooled with subsequent heating or roasting.

BRIEF DESCRIPTION OF THE DRAWINGS

The sole FIGURE depicts a flow sheet of one mode of the inventive method.

PREFERRED EMBODIMENTS OF THE INVENTION

The present invention permits the utilization of coal ashes obtained from the burning of brown coal or the like as a unique material applicable to construction projects and high performance ceramic glasses. The inventive method is particularly adapted to the treatment of coal ashes containing considerable amounts of free calcium oxide and transition metals such as iron, manganese, chromium, titanium or the like.

By practicing the inventive method, ready-to-use products are provided such as:

Thermal insulation slabs for warmth-preserving layers in single block house construction or as warmth-preserving means for roofs, floors and panels;

Ceramic glass, tile for internal walls and floor lining;

Glass tile for internal wall lining and external wall facing;

Efficient brick with high performance characteristics for brick laying of external walls and storied buildings; and Tiles for roofs of buildings.

Prior art building materials based on highly calcinized ashes from the burning of brown coal get destroyed within time due to the process of hydration of the chemically uncombined calcium oxide present therein. The inventive method solves this problem by the formation of a foamed glass material using a thermal shock or cooling step wherein gases are released during the thermal shock to form a porous enclosed structure.

Exemplary properties of foamed material formed according to the invention have the following characteristics:

Porosity: 10–80%;

Density: 50 to 300 kilogram/cubic meter;

Acid resistance to 96% sodium chloride solution: 99.07%;

Alkali resistance to 35% in a NaCl solution: 99.06%— thermal conductivity—0.04 to 0.08 watts/micron °C.

The obtained foamed glass materials can be used as original thermal insulation material and as an accumulator during the production of light concrete and thermal insulation slabs. Formation of these slabs is considered to be well known in the art and further detail is not deemed necessary for understanding of the invention. These slabs, when using non-organic materials as a binder and a small amount of a water-repellant addition, exhibit the following physical-mechanical characteristics:

Thermal conductivity: 0.025–0.65 watts/micron °C.;

Strength under compression 0.35–0.65 MPa, under curve 0.25–0.040 MPa;

Density: 250–350 Kilogram/cubic meters;

Water adsorption within one hour: 5–7% of slab mass.

As stated above, one of the problems involved in using coal ashes from burned brown coal is the presence of transition metals in the brown coal ash-slag waste. The inventive method overcomes this problem by adjustment of the carbon content of the ash-slag waste to a level which purifies the melt by reduction of transition metal oxides and generation of a gaseous medium to produce the foamed glass material.

The adjustment of the carbon content of the charge of ash-slag waste is dependent on the levels of carbon and transition metals in the waste. Since the ash-slag waste typically contains small levels of carbon, the carbon content must be increased to an effective amount, preferably to between 3 and 8% weight of the charge for effective transition metal recovery and formation of the gaseous material for foamed glass material production. When adjusting the carbon content, it is preferred to add brown coal to the ash-slag waste prior to melting. However, carbon briquettes, graphite or the like may be used to adjust the carbon level of the ash-slag waste prior to melting. The effective amount of carbon is that amount sufficient to reduce the iron levels to less than 0.15% iron and form carbides in sufficient quantity to form gases for the boiling layer effect.

Once the charge is adjusted in carbon, it is melted at which time the carbon in the charge interacts with the transition metal oxides, particularly iron oxide, to form a separate melt of the transition metals which separates from the slag melt based upon the difference in densities. The iron oxides are reduced by the following equation:

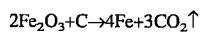

$$2Fe_2O_3 + C \rightarrow 4Fe + 3CO_2\uparrow$$

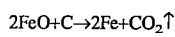

$$2FeO + C \rightarrow 2Fe + CO_2\uparrow$$

During this step, the carbon also combines with calcium, aluminum and other alkaline or alkaline-earth metals in the melted material to form carbides. These carbides as well as silicides and sulfides of the alkali or alkaline earth metals also interact with the iron oxide for iron restoration. The free calcium oxide is tied up or bound by way of the fusion occurring during ash-slag melting.

The second step for restoring the iron involves the thermal shock step wherein the melted ash-slag waste is charged into a cooling bath. During this step, water-soluble carbides and sulfides present in the molten ash-slag waste combine with the cooling water to generate gases of carbon monoxide, carbon dioxide, hydrogen and water. This abundant release of gas creates a boiling layer effect which makes the molten material porous. The amount of gas generated is principally dependent upon the number of carbides formed in the melted ash-slag waste. The generation of the gas can be calculated stoichiometrically based upon the initial charge analysis, taking into account the carbon, iron, etc. Since this mass balance is well within the skill of the art, a further detailed explanation is not deemed necessary.

The amount of gas produced as a result of the thermal shocking step relates also to the structure of the foamed material. A more open or more closed porous structure can be achieved depending on the volume of gas. It is preferred that about 33 cubic centimeters of gas per 100 grams of molten material is maintained for foaming the molten ash-slag waste. A higher ratio of gas to molten material will result in a more porous structure. Likewise, a lower ratio will result in a more closed structure. A broad range for the gas to molten material ratio extends between about 10 cubic centimeters per 100 grams of molten material up to several thousand centimeters of gas (3000) per 100 grams of molten material. The sole FIGURE details the processing steps described above wherein the carbon content of the charge is adjusted and the melted charge is cooled by pouring it into a water bath to produce the foamed material.

As stated, the restoration of iron is dependent on the chemical composition of the ash-slag waste and also the temperature of the melt. Typically, the iron is reduced in stages. For example, a charge having an iron oxide content ranges between 1 and 24 weight percent can be brought down to as low as 0.01% by weight total iron using the inventive process. The iron formed during melting can be separated from the molten slag. Further iron formation can be recovered during the boiling layer phase of the method. Typically, more than 50% of the iron oxide is reduced during the thermal shock step. The minute amount of iron in the foamed glass material makes it possible to use it as a source raw material for crystal ceramic glass materials having a high coefficient of light absorption and light transmissivity.

It is also possible to form the foamed gas material of a spherical shape by introducing an inert gas in addition to the gas generated from the decomposition of the carbides formed in the molten ash-slag waste. This inert gas can be introduced by flowing it into the melt as it is poured into the cooling bath. Alternatively, the inert gas, preferably, carbon dioxide, can be injected into the cooling bath while the melt is poured therein. The inert gas tends to break up the stream of molten material into separate portions which allows for better control of the geometric sizes of the foam materials. In addition, the inert gas serves as a cover to protect the molten material from oxidation.

In another aspect of the invention, the foamed glass material can be used as a source material for the production of bricks and blocks with a firing and non-firing method. In these methods, the foamed material may be ground to a suitable brick making size, e.g. <200 mesh. More preferably, the foamed material is reduced to <80μ.

The firing method includes molding a product out of the foamed material, drying and firing it at an elevated temperature as is commonly done in brick manufacture. Exemplary of these temperatures include a range from 900° to 1200° C. The maximum temperature for the firing is determined by the maximum level of crystallization at the curve of the differential thermal analysis.

During the press molding step, conventional binders such as soda glass, cement, tar, lignosulfinate etc. can be used during press molding.

Bricks made according to this method have the following characteristics:

Thermal conductivity in the dry state: 0.415±5.1% watts/micron °C.;

Compression limit: 30 MPa;

Water adsorption: 12 to 18%;

Frost resistance, frost-defrost cycles: 75.

These products are comparable with ceramic hollow brick for its thermal conductivity, compression resistance limits and can be used in thinner fence constructions.

The non-firing method includes molding the products out of the foamed material with a cementing material in the amount of about 20% of the total weight followed by natural drying for up to 20 days. The physical and mechanical characteristics of these bricks are:

Thermal conductivity: 0.525 watts/microns °C.;

Compression limit: 30 MPa;

Water adsorption: 26%;

Frost resistance, frost-defrost cycle: more than 50.

The products according to the non-firing method correspond to the brick with compression resistance limits of 30 MPa and relate to the group of conventionally efficient bricks providing thermal-technical characteristics for fences while using reduced brick thicknesses.

The firing method, also characterized as roasting, is carried out in atmospheric air and strengthens the foam glass material after it has been molded or pressed into a desired shape. When the foamed glass material is disintegrated, it can also be roasted in atmospheric air to increase its rigidity for subsequent pressing or molding.

The pore size of the foamed glass material can vary depending on the processing parameters of the thermal shock and the nature of the molten ash-slag waste. The pore sizes can range from a few microns to several millimeters. One of the most important characteristics of the porous material is the heat conductivity. The heat conductivity can fluctuate in the range of 0.04 to 0.09 watts per micron °C., depending on the chemical composition of the molten material in the size of the pores.

In yet a further aspect of the invention, optical materials with a wide transmissivity and high transparency for invisible and infrared spectra can be formed using the inventive foamed glass material. In this aspect, the foamed glass material obtained from the thermal shock step described above is melted and poured into molds which have been preheated to a desired temperature, e.g. 400°–600° C. The melted material in the molds is maintained at a temperature, preferably 800° to 850° C. for one to two hours followed by subsequent cooling to room temperature. With this sequence of steps, a glass ceramic material is produced having a high light transmissivity. This high transmissivity is a result of the purification step described above wherein the transition metals such as iron and the like are removed such that the foamed glass material is low in iron content. This material can then be poured into molds and cooled to obtain a desired shape.

A more preferred method of producing glass materials from ash-slag waste comprises providing a charge of the waste having the following composition (wt %)

| | |
|---|---|
| CaO total | 5.0–41.0 |
| CaO unbound | 4.0–13.0 |
| $SiO_2$ | 13.0–75.0 |
| $Al_2O_3$ | 5.0–26.0 |
| carbon | 1.0–2.0 |
| $Fe_2O_3$ | 1.0–24.0 |
| MgO | 2.0–6.0 |
| $Na_2O$ | 0.1–1.0 |
| $K_2O$ | 0.2–1.0 |
| $SO_3$ | 0.1–0.6 |
| $TiO_2$ | 0.2, | wherein the charge is heated to a melting point temperature and melted in a reducing medium, whereupon the obtained melt is cooled by a thermal shock with simultaneous formation of the foamed glass material in the flow of gaseous medium.

In ash-slag waste formed as a result of burning coals of various deposits, carbon content generally does not exceed 5 wt % which is not sufficient for carrying out the process, permit complete recovery of iron oxides and form carbides. Therefore, for carrying out the process of direct recovery of iron oxides, prior to heating of the charge, the carbon content is brought to 3.0–8.0 wt %. This quantity range of the carbon is dependent upon the percentage content of iron oxides in the initial ash-slag waste material. The carbon is added in any conventional manner, preferably by the addition of coal to the waste prior to melting.

The reducing medium can be any type known in the art such as CO, $H_2$, natural gas, producer gas or the like.

To prepare the glass material with the foamed structure, the process uses gases resulting from decomposition of carbides, inert gases or the mixture of both.

Given below are specific examples of carrying out the method of producing glass materials from ash-slag waste formed by burning coals. Differences in the replaced percentages from 100% are based upon unanalyzed components and losses during testing.

EXAMPLE 1

500 g of ash-slag waste (ash) of the following composition (wt %):

| | |
|---|---|
| CaO total | 20.0 |
| CaO unbound | 4.0 |
| $SiO_2$ | 48.47 |
| $Al_2O_3$ | 9.43 |
| carbon | 1.0 |
| $Fe_2O_3$ | 6.0 |
| MgO | 0.31 |
| $Na_2O$ | 0.31 |
| $K_2O$ | 0.36 |
| $SO_3$ | 0.13 |
| $TiO_2$ | 0.2, | is melted in a graphite crucible at a temperature of from 1350 to 1550° C. for two hours and a half. Prior to heating, the carbon content in the charge is brought to 3.0 wt %. The carbon reduces the iron to produce a melt with total iron content of 0.15 wt %. This melt is cooled under the conditions of thermal shock by pouring into water.

The thermal shock causes instantaneous foaming of the glass material. The obtained porous material is disintegrated to attain a required fineness and calcined to strengthen the pores by heating to 850° C. in air, and then cooled. The obtained glass material has a bulk density of 150 kg/m$^3$.

EXAMPLE 2

500 g of ash of the composition similar to that of Example 1 is melted in a graphite crucible at a temperature of from 1350° to 1550° C. for two hours. The obtained melt having a total iron content of 0.1 wt % is cooled under the conditions of a thermal shock by pouring into water. This causes instantaneous foaming of the glass material. The obtained porous glass material is disintegrated to attain a required fineness and roasted by heating to a temperature of 850° C. to strengthen the pores, whereupon it is cooled. The material thus prepared has a bulk density of 120 kg/m$^3$.

EXAMPLE 3

500 g of ash of the composition similar to that of Example 1 is melted in a graphite crucible at a temperature of 1350°–1550° C. for four hours. The obtained melt having a total iron content of 0.05 wt % is cooled under the conditions of a thermal shock by pouring into water, whereby instantaneous foaming of the glass material takes place. The foamed glass material thus prepared is disintegrated to attain a requisite fineness and heated to 850° C. to strengthen the pores, whereupon it is cooled. The prepared glass material has a bulk density of 80 kg/m$^3$.

EXAMPLE 4

500 g of ash of the following composition (wt %):

| | |
|---|---|
| CaO total | 20.5 |
| CaO unbound | 11.7 |
| $SiO_2$ | 41.3 |
| $Al_2O_3$ | 5.0 |
| carbon | 3.0 |
| $Fe_2O_3$ | 12.0 |
| MgO | 4.5 |
| $Na_2O$ | 1.2 |
| $K_2O$ | 0.4 |
| $SO_3$ | 0.2 |
| $TiO_2$ | 0.2 | is heated and melted in a graphite crucible at a temperature of 1350°–1550° C. for two hours and a half. Prior to heating of the charge, the carbon content therein is brought to 3 wt %. The melt thus obtained having a total iron content of 0.15 wt % is cooled under the conditions of a thermal shock by pouring into water. This causes instantaneous foaming of the melt. The obtained porous glass material is disintegrated to attain a requisite fineness and heat-treated by the method depicted in Example 1. The prepared glass material features bulk density of 150 kg/m$^3$.

EXAMPLE 5

500 g of ash of the composition indicated in Example 4 is melted in a graphite crucible for three hours. The obtained melt with a total iron content of 0.1 wt % is cooled under the conditions of a thermal shock by pouring into water, whereby instantaneous foaming of the mass takes place. The obtained porous glass material is heat-treated by the method of Example 1. The prepared glass material features a bulk density of 100 kg/m$^3$.

EXAMPLE 6

500 g of ash of the composition described in Example 4 is melted for four hours, the obtained melt with the iron content of 0.05 wt 8, chromium, 0.02 wt % and titanium, 0.1 wt %, is cooled in the similar way as in Examples 4 and 5. The obtained glass material has a bulk density of 50 kg/m$^3$.

EXAMPLE 7

500 g of ash with the composition, wt %:

| | |
|---|---|
| CaO total | 3.1 |
| CaO unbound | none |
| $SiO_2$ | 50.5 |
| $Al_2O_3$ | 19.2 |
| carbon | 5.0 |
| $Fe_2O_3$ | 20.0 |
| MgO | 0.6 |
| $Na_2O$ | 0.2 |
| $K_2O$ | 0.9 |
| $SO_3$ | 0.4 |
| $TiO_2$ | 0.2 |

Prior to heating the charge, the carbon content in the charge is brought to 8 wt %, then the charge is melted in a graphite crucible at a temperature of 1350° to 1550° C. for two hours and a half. The melt thus produced having a total iron content of 0.15 wt % is cooled under the conditions of a thermal shock by pouring into water.

This cause instantaneous foaming of the mass. The obtained porous glass material is heat-treated similarly to Example 2. The glass material produced is characterized by a bulk density of 150 kg/m³.

EXAMPLE 8

500 g of ash having the composition listed in Example 7 is melted and heat-treated similarly to Example 2. The prepared glass material has a bulk density of 120 kg/m₃.

EXAMPLE 9

500 g of ash of the composition indicated in Example 7 is melted and heat-treated similarly to the Example 3. The produced glass material features a bulk density of 80 kg/m³.

EXAMPLE 10

500 g of ash having the following composition (wt %):

| | |
|---|---|
| CaO total | 20.0 |
| CaO unbound | 4.0 |
| $SiO_2$ | 58 |
| $Al_2O_3$ | 9.4 |
| $Fe_2O_3$ | 1.0 |
| MgO | 5.3 |
| $Na_2O$ | 0.3 |
| $K_2O$ | 0.4 |
| $SO_3$ | 0.13 |
| $TiO_2$ | 0.2 | wherein the carbon content in the charge is brought to 3 wt %, is heated and melted in a graphite crucible at a temperature of 1350° to 1550° C. for an hour and a half. The obtained melt with a total iron content amounting to 0.15 wt % is cooled under the conditions of a thermal shock by pouring into water, whereby instantaneous foaming of the glass material is caused. The obtained porous glass material is disintegrated to attain a requisite fineness and roasted to a temperature of 850° C., and subsequently cooled. The prepared glass material has a bulk density of 150 kg/m³.

EXAMPLE 11

500 g of ash of the composition specified in Example 10 is melted in a graphite crucible at a temperature of 1340°–1550° C. for two hours. The melt obtained with a total iron content of 0.1 wt % is cooled under the conditions of a thermal shock by pouring into water, whereby instantaneous foaming of the material is caused. The obtained porous glass material is processed similarly to Example 10. The prepared glass material is characterized by a bulk density of 120 kg/m³.

EXAMPLE 12

500 g of ash having the composition of Example 10 is melted in a graphite crucible at a temperature of 1350°–1550° C. for two hours and a half. The melt thus prepared with a total iron content of 0.05 wt % is cooled under the conditions of a thermal shock by pouring into water. This causes instantaneous foaming of the glass material. The obtained glass material is processed as in Example 10. The density of the glass material is 80 kg/m³.

EXAMPLE 13

500 g of ash having the composition specified in Example 1 is melted and heat treated in the way similar to that of Example 1. The obtained glass material is dispersed to the fineness sized from 0 to 80 μm, then cubes of 100×100×100 mm size and bars of 40×40×100 mm size are press molded from the powder. The molded articles are dried and roasted at a temperature of 950° C. for 50 min with subsequent cooling in the furnace. The produced samples have the following characteristics:

| | |
|---|---|
| ultimate compression strength, MPa | 39.3 |
| ultimate bending strength, MPa | 7.7 |

EXAMPLE 14

500 g of ash of the composition indicated in Example 1 is melted and heat-treated as in Example 2. The obtained glass material is dispersed to the fineness of from 0 to 80 μm, then cubes of 100×100×100 mm size and bars of 40×40×160 mm size are press-molded from the powder. The molded articles are dried and then roasted at a temperature of 950° C. for 30 min with subsequent cooling in the furnace. The obtained samples have the following characteristics:

| | |
|---|---|
| ultimate compression strength, MPa | 40.0 |
| ultimate bending strength, MPa | 8.0 |

EXAMPLE 15

500 g of ash of the composition indicated in the Example 1 is melted and heat treated similarly to Example 3. The obtained glass material is dispersed to the fineness of from 0 to 80 μm, then molded and heat treated as in Example 10. The obtained samples feature the following characteristics:

| | |
|---|---|
| ultimate compression strength, MPa | 43.2 |
| ultimate bending strength, MPa | 8.1 |

EXAMPLE 16

500 g of ash having the composition specified in Example 4 is melted and heat treated in the way similar to that of Example 1, the articles are molded and roasted as in Example 13. The obtained samples have the following characteristics:

| | |
|---|---|
| ultimate compression strength, MPa | 39.0 |
| ultimate bending strength, MPa | 7.5 |

EXAMPLE 17

500 g of ash having the composition similar to that of Example 4 is melted and heat treated as in Example 2. Then the material is dispersed, molded and heat treated in the same manner as in Example 13. The obtained samples have the following characteristics:

| | |
|---|---|
| ultimate compression strength, MPa | 43.0 |
| ultimate bending strength, MPa | 8.3 |

EXAMPLE 18

500 g of ash having the composition indicated in Example 4 is melted, heat treated, molded and roasted in the similar way as in Examples 3 and 13. The obtained samples have the following characteristics:

| ultimate compression strength, MPa | 44.2 |
|---|---|
| ultimate bending strength, MPa | 8.5 |

EXAMPLE 19

500 g of ash having the composition indicated in Example 7 is melted, heat treated and roasted similarly to Examples 1 and 13. The obtained samples have the following characteristics:

| ultimate compression strength, MPa | 19.1 |
|---|---|
| ultimate bending strength, MPa | 2.6 |

EXAMPLE 20

500 g of ash of the composition specified in Example 7 is melted, heat treated, molded and roasted similarly to Examples 2 and 13. The obtained samples have the following characteristics:

| ultimate compression strength, MPa | 19.5 |
|---|---|
| ultimate bending strength, MPa | 2.7 |

EXAMPLE 21

500 g of ash having the composition specified in Example 7 is melted, heat treated, molded and roasted in the way similar to that of Examples 3 and 13.

The obtained samples have the following properties:

| ultimate compression strength, MPa | 20.0 |
|---|---|
| ultimate bending strength, MPa | 2.6 |

EXAMPLE 22

500 g of ash having the composition similar to that of Example 7 is melted, heat treated and molded as in Example 3 and 13, while roasting is carried out at a temperature of 1050° C. for thirty minutes with subsequent cooling in the furnace. The obtained samples have the following characteristics:

| ultimate compression strength, MPa | 60.0 |
|---|---|
| ultimate bending strength, MPa | 9.0 |

EXAMPLE 23

500 g of ash of the composition of Example 1 is melted in a graphite crucible at a temperature of from 1350° to 1450° C. for two hours and a half. The obtained melt having a total iron content of 0.15 wt % is poured into graphite molds preheated to 550° C., then the temperature is raised to 800°–850° C., the melt stands at this temperature for an hour and a half with subsequent cooling in the electric furnace to a room temperature. The prepared glass ceramic materials have the following characteristics:

| light transmission factor, % | 30.0 |
|---|---|
| thermal conductivity, W/m · K micron | 0.8 |
| linear expansion coefficient °C.$^{-1}$ | $6 \times 10^{-6}$ |
| ultimate bending strength, MPa | 75.0 |

EXAMPLE 24

500 g of ash having the composition specified in Example 1 is melted as in Example 2. The obtained melt is poured into the mold and heat treated in the way similar to that of Example 23. The prepared glass ceramic materials have the following properties:

| light transmission factor, % | 40.0 |
|---|---|
| thermal conductivity, W/m · K | 0.8 |
| linear expansion coefficient, °C.$^{-1}$ | $5 \times 10^{-6}$ |
| ultimate bending strength, MPa | 75.0 |

EXAMPLE 25

500 g of ash having the composition indicated in Example 1 is melted in the way similar to that of Example 3, molded and roasted as in Example 23. The produced glass ceramic materials have the following characteristics:

| light transmission factor, % | 50.0 |
|---|---|
| thermal conductivity, W/m · K | 0.7 |
| linear expansion coefficient, °C.$^{-1}$ | $5 \times 10^{-6}$ |
| ultimate bending strength, MPa | 80.0 |

EXAMPLE 26

500 g of ash of the composition specified in Example 4 is processed as disclosed in Example 23. The glass ceramic materials produced have the following properties:

| light transmission factor, % | 30.0 |
|---|---|
| thermal conductivity, W/m · K | 0.8 |
| linear expansion coefficient, °C.$^{-1}$ | $6 \times 10^{-6}$ |
| ultimate bending strength, MPa | 75.0 |

EXAMPLE 27

500 g ash having the composition specified in Example 4 is processed as in Example 24. The obtained glass ceramic materials have the following characteristics:

| light transmission factor, % | 40.0 |
|---|---|
| thermal conductivity, W/m · K | 0.75 |
| linear expansion coefficient, °C.$^{-1}$ | $5.5 \times 10^{-6}$ |
| ultimate bending strength, MPa | 75.0 |

EXAMPLE 28

500 g of ash with the composition of Example 4 is processed in the way similar to Example 25. The obtained glass ceramic materials have the following properties:

| light transmission factor, % | 50.0 |
|---|---|
| thermal conductivity, W/m · K | 0.7 |
| linear expansion coefficient, °C.$^{-1}$ | $5 \times 10^{-6}$ |
| ultimate bending strength, MPa | 80.0 |

EXAMPLE 29

500 g of ash having the composition indicated in Example 7 is heat treated in the way similar to that of Example 23.

The produced glass ceramic materials feature the following characteristics:

| | |
|---|---|
| light transmission factor, % | 30.0 |
| thermal conductivity, W/m · K | 0.8 |
| linear expansion coefficient, °C.$^{-1}$ | $5 \times 10^{-6}$ |
| ultimate bending strength, MPa | 90.0 |

EXAMPLE 30

500 g of ash of the composition indicated in Example 7 is heat treated as in Example 24. The obtained glass ceramic materials have the following characteristics:

| | |
|---|---|
| light transmission factor, % | 40.0 |
| thermal conductivity, W/m · K | 0.75 |
| linear expansion coefficient, °C.$^{-1}$ | $5 \times 10^{-6}$ |
| ultimate bending strength, MPa | 95.0 |

EXAMPLE 31

500 g of ash having the composition indicated in Example 7 is heat treated in the way similar to that of Example 25. The glass ceramic materials produced have the following characteristics:

| | |
|---|---|
| light transmission factor, % | 50.0 |
| thermal conductivity, W/m · K | 0.7 |
| linear expansion coefficient, °C.$^{-1}$ | $5 \times 10^{-6}$ |
| ultimate bending strength, MPa | 100 |

EXAMPLE 32

500 g of the porous glass material obtained in Example 1 is placed into an alundum crucible and melted at a temperature of from 1450° to 1500° C. for 2 hours. The melt is poured into graphite molds which have been preheated to 550° C. and heated to 850° C., whereupon the melt stands at this temperature for two hours with subsequent cooling in the furnace to a room temperature.

The transmissivity in the visible and infrared spectra of electromagnetic waves of the samples is equal to 75%.

EXAMPLE 33

500 g of the porous glass material obtained in Example 2 is melted and heat treated similarly to the process of Example 32. The transmissivity in the visible and infrared spectra of electromagnetic waves of the obtained samples is 85%.

EXAMPLE 34

500 g of the porous glass material obtained in Example 3 is melted and heat treated similarly to the process of Example 32. The transmissivity in the visible and infrared spectra of electromagnetic waves of the samples produced amounts to 95%.

EXAMPLE 35

500 g of the porous glass material obtained in Example 4 is melted and heat treated as in Example 32. The transmissivity in the visible and infrared spectra of electromagnetic waves of the samples produced is 70%.

EXAMPLE 36

500 g of porous glass material prepared in Example 5 is melted and heat treated as in Example 32. The transmissivity in the visible and infrared spectra of electromagnetic waves is 80%.

EXAMPLE 37

500 g of porous glass material obtained in Example 6 is melted and heat treated similarly to the process of Example 32. The transmissivity in the visible and infrared spectra of electromagnetic waves of the samples produced amounts to 90%.

EXAMPLE 38

500 g of porous glass material obtained in Example 7 is melted and heat treated as in Example 32. The transmissivity in the visible and infrared spectra of electromagnetic waves of the samples produced is 70%.

EXAMPLE 39

500 g of porous material obtained in Example 8 is melted and heat treated as in Example 32. The transmissivity in the visible and infrared spectra of electromagnetic waves of the glass ceramic material obtained is 80%.

EXAMPLE 40

500 g of porous material obtained in Example 9 is melted and heat treated similarly to the process of Example 29. The transmissivity in the visible and infrared spectra of electromagnetic waves of the glass ceramic materials produced amounts to 95%.

EXAMPLE 41

500 g of ash having the composition specified in Example 4 is melted as in Example 4. The obtained melt is cooled under the conditions of a thermal shock by pouring it onto an flow of inert gas ($CO_2$) ascending in the direction of pouring.

This result in that the obtained glass material acquires a hollow spherical shape with the density of its granules amounting to 1000 kg/m$^3$.

EXAMPLE 42

500 g of ash formed having the composition indicated in Example 4 is melted as described above. The obtained melt cooled under the conditions for a thermal shock by pouring into water, accompanied by blowing inert gas ($CO_2$) into the water, whereby more than 50% of the glass material has a hollow spherical shape of various diameters with the granules density of 500 kg/m$^3$.

EXAMPLE 43

500 g of ash having the composition specified in Example 4 is melted as in Example 4. The obtained melt is cooled under the conditions of a thermal shock by pouring the melt into water through the foamed material. Consequently, less than 50% of the total mass of the glass material produced has a hollow spherical shape of different diameters with the density of the granules from 100 to 300 kg/m³.

Industrial Applicability

The present invention can be most effectively used for the production of construction materials of diverse purposes (bricks, heat- and sound-insulating materials, facing and ceramic materials) filtering materials, chemically stable materials. Moreover, the proposed method helps obtain glass materials featuring a high light transmission factor and utilized in magnetooptics (magnetooptical memory disks, liquid crystal light modulators), as well as in astronomical optics.

We claim:

1. A method of producing foamed glass materials from ash-slag waste derived from burning coals comprising the steps of:

a) providing a charge of the ash-slag waste including calcium oxide and iron oxide in the following amounts of wt %:

|  |  |
|---|---|
| CaO total | 5.0–41.0 |
| CaO unbound | 4.0–13.0 |
| $Fe_2O_3$ | 1.0–24.0 | b) heating and melting the charge; and c) forming said foamed glass material by pouring said melted charge into a water bath;

d) wherein, prior to said heating and melting of the charge, a carbon content of the charge is adjusted to an amount effective to reduce the $Fe_2O_3$ content of the charge to less than 1% by weight and to form carbides in said melt whereby a gaseous medium is generated from the carbides to foam said melt to produce the foamed glass materials.

2. A method according to claim 1, wherein said adjusting step comprises adjusting the carbon content of the charge to 3.0 to 8.0 wt % carbon.

3. A method according to claim 1, wherein said melt is contacted with an inert gas.

4. A method according to claim 3, comprising blowing the inert gas into the water bath.

5. The method of claim 3 wherein the inert gas is injected into said melt during the pouring of said melt into said water bath.

6. The method of claim 1 further comprising the steps of disintegrating said foamed glass material, heating said disintegrated glass material in air to increase its strength and cooling said heated glass material to increase the bulk density of said glass material.

7. The method of claim 1 further comprising the steps of disintegrating said foamed glass material, press molding said disintegrated glass material to a predetermined shape, heating said press molded glass material in air to increase its strength and cooling said heated glass material to form a molded article.

8. The method of claim 1 further comprising the step of melting said foamed glass materials, heating said melted glass material and cooling said heated material to form an optical material.

9. The method of claim 1 wherein said gaseous medium is generated at a rate between 10 and 3000 cubic centimeters/100 gm of said charge.

10. The method of claim 9 wherein said rate ranges between 30 and 90 cubic centimeters/100 gm of said charge.

11. The method of claim 1 wherein the charge of the providing step has the following composition:

|  |  |
|---|---|
| CaO total | 5.0–41.0 |
| CaO unbound | 4.0–13.0 |
| $SiO_2$ | 13.0–75.0 |
| $Al_2O_3$ | 5.0–26.0 |
| carbon | 1.0–2.0 |
| $Fe_2O_3$ | 1.0–24.0 |
| MgO | 2.0–6.0 |
| $Na_2O$ | 0.1–1.0 |
| $K_2O$ | 0.2–1.0 |
| $SO_3$ | 0.1–0.6 |
| $TiO_2$ | 0.2, and | the adjusted carbon of the charge ranges between 3.0 and 8.0 wt %.

* * * * *